W. T. SMITH.
VALVE AND LOCKING DEVICE THEREFOR.
APPLICATION FILED SEPT. 27, 1920.
1,383,869. Patented July 5, 1921.
Fig. 1.
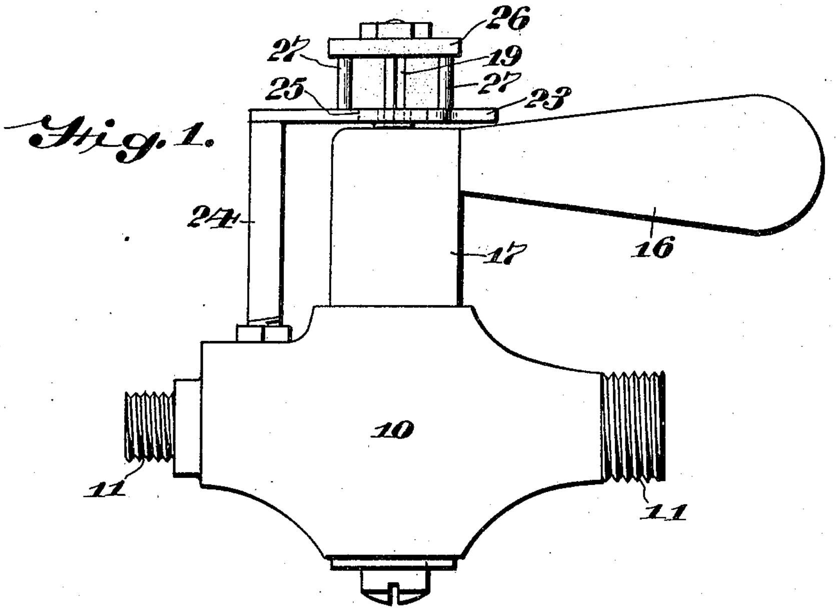
Fig. 2.
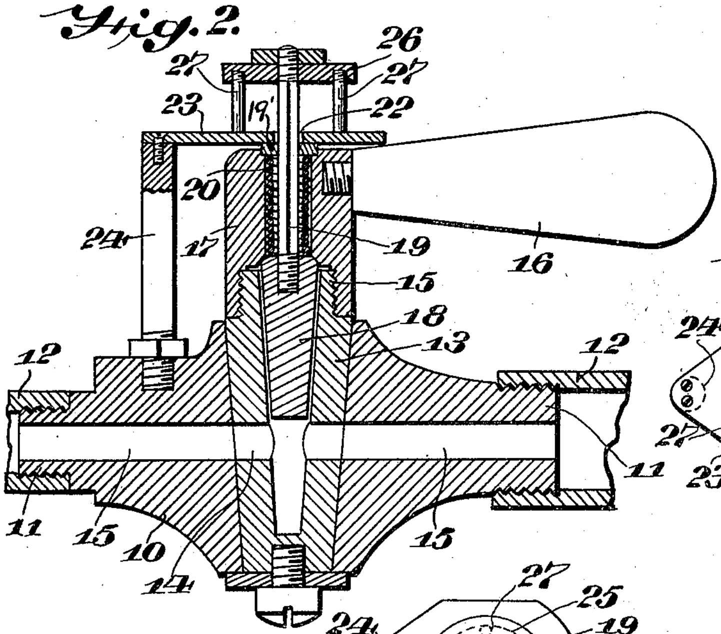
Fig. 3.
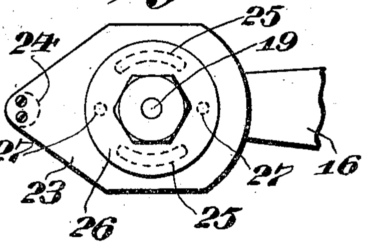
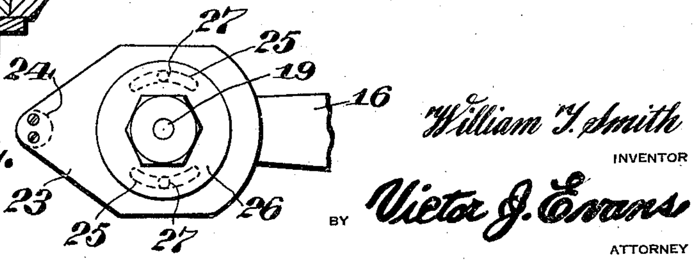
Fig. 4.
William T. Smith
INVENTOR
Alfred T. Bratton
WITNESS:
BY Victor J. Evans
ATTORNEY

UNITED STATES PATENT OFFICE.

WILLIAM T. SMITH, OF PHILADELPHIA, PENNSYLVANIA, ASSIGNOR OF ONE-HALF TO WILLIAM R. THOMAS, OF PHILADELPHIA, PENNSYLVANIA.

VALVE AND LOCKING DEVICE THEREFOR.

1,383,869. Specification of Letters Patent. Patented July 5, 1921.

Application filed September 27, 1920. Serial No. 412,940.

*To all whom it may concern:*

Be it known that I, William T. Smith, a citizen of the United States, residing at Philadelphia, in the county of Philadelphia and State of Pennsylvania, have invented new and useful Improvements in Valves and Locking Devices Therefor, of which the following is a specification.

An object of the invention is to provide a valve in the nature of a gas cock or the like, which includes suitable locking mechanism whereby when the gas cock is open and is accidentally closed at a subsequent time, and then an attempt made to reopen it, the valve will be retained in a locked position preventing reopening thereof until the same is manipulated in a particular manner, bringing about the unlocking thereof.

The invention is particularly adapted for use in connection with the gas cocks usually found on gas stoves and is in the nature of a safety device to prevent a child turning off the valve and then subsequently turning it on again, and in which event, with the present form of gas cocks now generally used, the gas from the stove would be permitted to fill the room and cause suffocation or asphyxiation.

My invention comprehends a simple form of mechanism whereby it is only necessary to raise the handle of the valve to bring about an unlocking thereof so that the valve can be opened, and if the valve should be accidentally or otherwise closed, it will automatically lock and cut off the supply of gas.

In the further disclosure of the invention reference is to be had to the accompanying drawings constituting a part of this specification, in which similar characters of reference denote corresponding parts in all the views, and in which,—

Figure 1 is an elevation of the device.

Fig. 2 is a vertical sectional view taken through the valve, the valve proper and supplementary valve being shown in open position.

Fig. 3 is a fragmentary plan view showing the position of the slots and retaining pins when the valve is open, and Fig. 4 is a similar view showing the relation of the slots and retaining pins when the valve is closed.

Referring more particularly to the views I provide a body 10 which is in the nature of a socket and which has ends 11 adapted for connection with the usual gas pipe 12. Seated in the socket portion of the body 10 is the usual tapered valve 13 and which has a cross passage 14 to be brought into or out of registration with passages 15 in the body 10 so that the gas can flow therethrough when the valve 13 is opened and will be cut off when the valve 13 is closed. The valve 13 is secured in any convenient manner in the body 10 and comprehends a threaded shank 15 with which a handle 16 has threaded connection, the said handle more particularly including a head 17 which is in threaded engagement with the shank 15. The valve 13 is cored out in the center to receive a supplementary valve 18 which when in raised position, permits the gas to pass through the passage 14 and when in lowered position cuts off the passage of gas through the passage 14. The supplementary valve 18 has a squared stem 19 passing upwardly through the head 17 and an expansible helical spring 20, is arranged in the head to bear down upon the top of the supplementary valve 18, the other end of the spring abutting against the below mentioned nut 19′. The stem 19 projects upwardly to pass through an opening 22 in a horizontal plate 23 carried on an upright 24 suitably secured to the body 10 and the horizontal plate 23 is provided with a plurality of opposed arcuate slots 25. The upper extremity of the squared stem 19 carries a cross piece 26 from which depend a plurality of retaining pins 27. A nut 19′ is seated in a recess at the upper end of the valve head 17, the nut being provided with a squared opening through which the squared stem 19 of the auxiliary valve 18 passes. By reason of this construction and arrangement of parts, it is manifest that the two valves 13 and 18 respectively are rotated in unison for the purpose to be hereinafter described.

When it is desired to open the gas cock to permit the gas to pass through the passage 14, the auxiliary valve 18 is elevated to the position shown in Fig. 2 by lifting upwardly on the cross piece 26, thus bring the retaining pins 27 out of the slots 25 onto which they normally extend. The valve 18 is held in this position at one end against the tension of the spring 20, while the handle 16 is operated to open the valve 13. The valve 18 is fitted in the valve 13 to turn with the latter, so that when the main valve 13 is opened the pins 27 are arranged at a vertical alinement with the slots 25, and rest upon the upper face of the plate 23. When the handle 16 is operated to close the valve 13, the auxiliary valve 18 turns with the main valve until the pins 27 are brought into alinement with the slots 25, at which time the spring 20 functions to move the auxiliary valve downwardly to close the passage in the valve casing. When the parts are in the position just mentioned the main valve 13 is locked against further movement and cannot be opened without first raising the auxiliary valve and the pins 27 to the position shown in Fig. 2.

It will be understood that I do not limit myself to the particular construction set out in the drawings and described in the specification; that various slight changes may be made without departing from the spirit of the invention and that the scope of the invention is defined in the appended claims.

Having described my invention, I claim—

1. A device of the character described comprising a body provided with passages and forming a socket, a rotary main valve provided with a cross passage and disposed in said socket to have its passage brought into or out of registration with the passages of the body, a supplementary valve movably disposed within the main valve to intercept the passage thereof, a handle for the main valve to actuate the same, said handle including a head, a stem on the supplementary valve and passing upwardly through the handle, a spring for actuating the supplementary valve, a slotted plate, and retaining pins carried on the stem of the supplementary valve to be moved when the handle is actuated to bring the retaining pins into or out of line with the slots in the said plate.

2. A device of the character described comprising a body providing a socket, a valve in said socket, a supplementary valve movably disposed in the main valve, a handle movable in a horizontal plane to actuate the main valve, and including a head, a stem on the supplementary valve, a slotted plate in superposition to the supplementary valve and retaining pins carried on the stem to be moved into or out of line with the said slots when the handle is actuated to actuate the main valve.

3. A device of the character described comprising a body providing a socket, a valve in said socket, a supplementary valve movably disposed in the main valve, a handle movable in a horizontal plane to actuate the main valve, a stem on the supplementary valve, a slotted plate in superposition to the supplementary valve, retaining pins carried on the stem to be moved into or out of line with the said slots when the handle is actuated to actuate the main valve, a spring disposed in the said head to engage said supplementary valve and hold the same in valve-closing position when the main valve is closed and the said pins depend into the said slots.

4. A device of the character described comprising a body providing a socket, a valve in said socket, a supplementary valve movably disposed in the main valve, a stem on the supplementary valve, a standard secured to the valve body and arranged in parallelism with said stem, a horizontally disposed plate mounted on the standard in super-position to the supplementary valve, said plate having an opening through which the stem slides, and oppositely disposed slots, and retaining pins carried on the stem to be moved into and out of line with said slots when the handle is actuated to adjust the main valve.

In testimony whereof I affix my signature.

WILLIAM T. SMITH.